United States Patent
Trapletti et al.

(10) Patent No.: US 12,338,948 B1
(45) Date of Patent: Jun. 24, 2025

(54) METHODS AND SYSTEMS FOR A LUBRICATION SYSTEM

(71) Applicant: DANA ITALIA S.R.L., Trentino (IT)

(72) Inventors: Simone Trapletti, Riva del Garda (IT); Gianluca Terrasi, Arco (IT); Andrea Bortoli, Trento (IT); Davide Deimichei, Trento (IT); Roberto Rampazzo, Trento (IT)

(73) Assignee: DANA ITALIA S.R.L., Arco (IT)

( * ) Notice: Subject to any disclaimer, the term of this patent is extended or adjusted under 35 U.S.C. 154(b) by 26 days.

(21) Appl. No.: 18/393,428

(22) Filed: Dec. 21, 2023

(51) Int. Cl.
*F16N 25/00* (2006.01)

(52) U.S. Cl.
CPC .......... *F16N 25/00* (2013.01); *F16N 2210/14* (2013.01)

(58) Field of Classification Search
CPC .................................................. F16N 2210/14
USPC .......................................................... 184/14
See application file for complete search history.

(56) References Cited

U.S. PATENT DOCUMENTS

| | | | | |
|---|---|---|---|---|
| 3,042,145 | A * | 7/1962 | Bixby | B60K 17/046 184/6.12 |
| 6,340,072 | B1 * | 1/2002 | Lannan | F16C 35/06 184/5.1 |
| 12,092,119 | B2 * | 9/2024 | Lucchetta | F04D 19/042 |
| 2003/0221911 | A1 * | 12/2003 | Eriksen | F16C 41/008 184/6.4 |
| 2010/0304914 | A1 * | 12/2010 | Barrett | F16H 48/08 475/160 |
| 2015/0292675 | A1 * | 10/2015 | Schjøtt | G01N 33/2858 184/6.4 |
| 2019/0046907 | A1 * | 2/2019 | Willems | F01M 11/03 |

FOREIGN PATENT DOCUMENTS

JP          2015108439 A     6/2015

* cited by examiner

*Primary Examiner* — Henry Y Liu
*Assistant Examiner* — Mark K Buse
(74) *Attorney, Agent, or Firm* — McCoy Russell LLP

(57) ABSTRACT

Methods and systems are provided for a lubrication system. The lubrication system includes a bulkhead arranged around an axle and in contact with a seat of a central housing, the bulkhead comprising an entrance diameter larger than an exit diameter, wherein the entrance diameter is positioned near a pinion head bearing and the exit diameter is positioned near a pinion tail bearing.

20 Claims, 10 Drawing Sheets

METHODS AND SYSTEMS FOR A LUBRICATION SYSTEM

TECHNICAL FIELD

The present description relates generally to a lubrication system. More specifically, the present disclosure relates to a bulkhead of a lubrication system.

BACKGROUND AND SUMMARY

Lubrication systems may be utilized to reduce friction and enhance performance of moving components. Lubrication systems may include various passages and cutouts to guide lubricant to desired locations. Modern vehicles are able to travel across slopes and gradients that may prevent adequate lubrication of vehicle components based on previous lubrication system designs.

For example, previous lubrication systems may include a relatively high lubricant level to ensure a determined amount of lubrication reaches rotational system components. However, these lubricant levels increase global warming and inefficiently utilize resources, such as lubricant. Thus, a system improved relative to those available is desired.

The issues described above may be addressed by a lubrication system including a bulkhead arranged around an axle and in contact with a seat of a central housing, the bulkhead comprising an entrance diameter larger than an exit diameter, wherein the entrance diameter is positioned near a pinion head bearing and the exit diameter is positioned near a pinion tail bearing. In this way, the bulkhead is configured to guide lubricant flow to desired regions, even when positioned on a slope.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
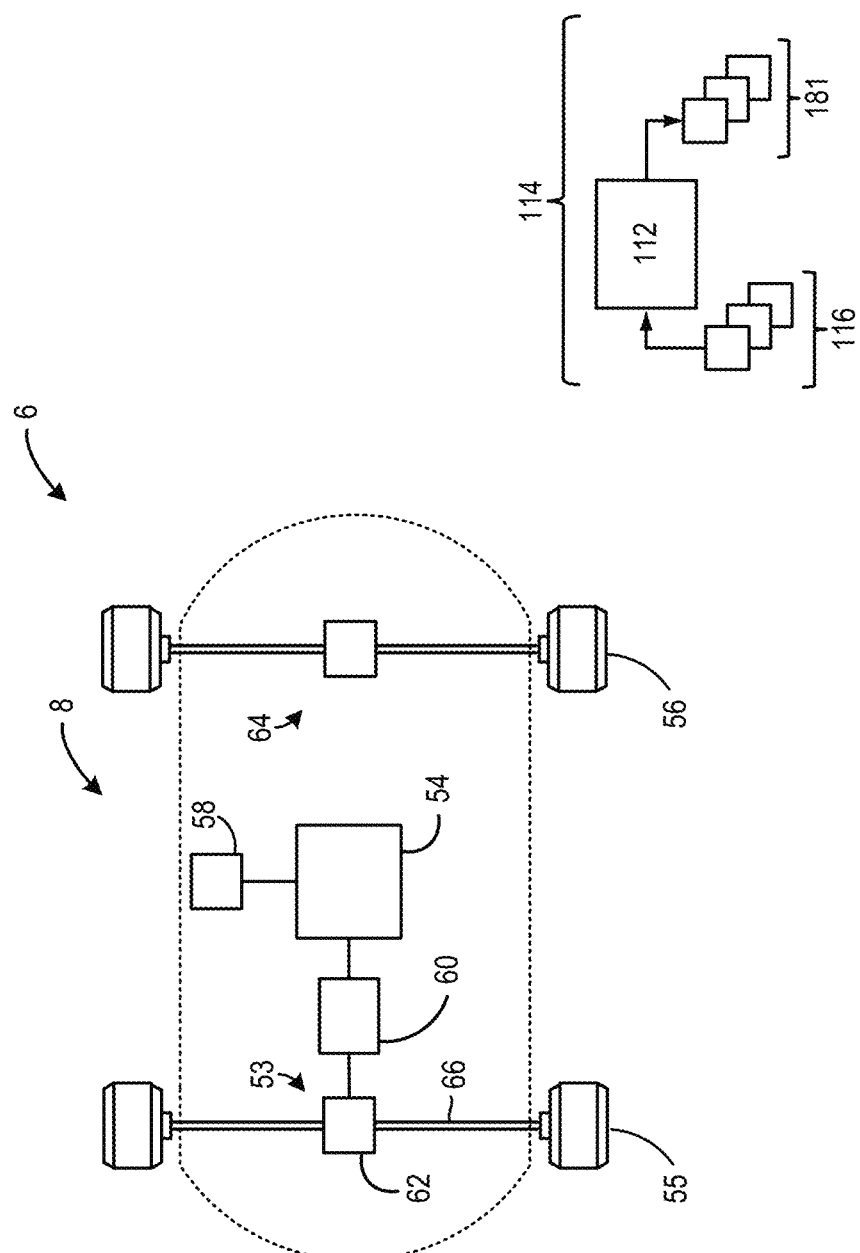
FIG. 1 shows an example of a vehicle system.
Figure 2A:
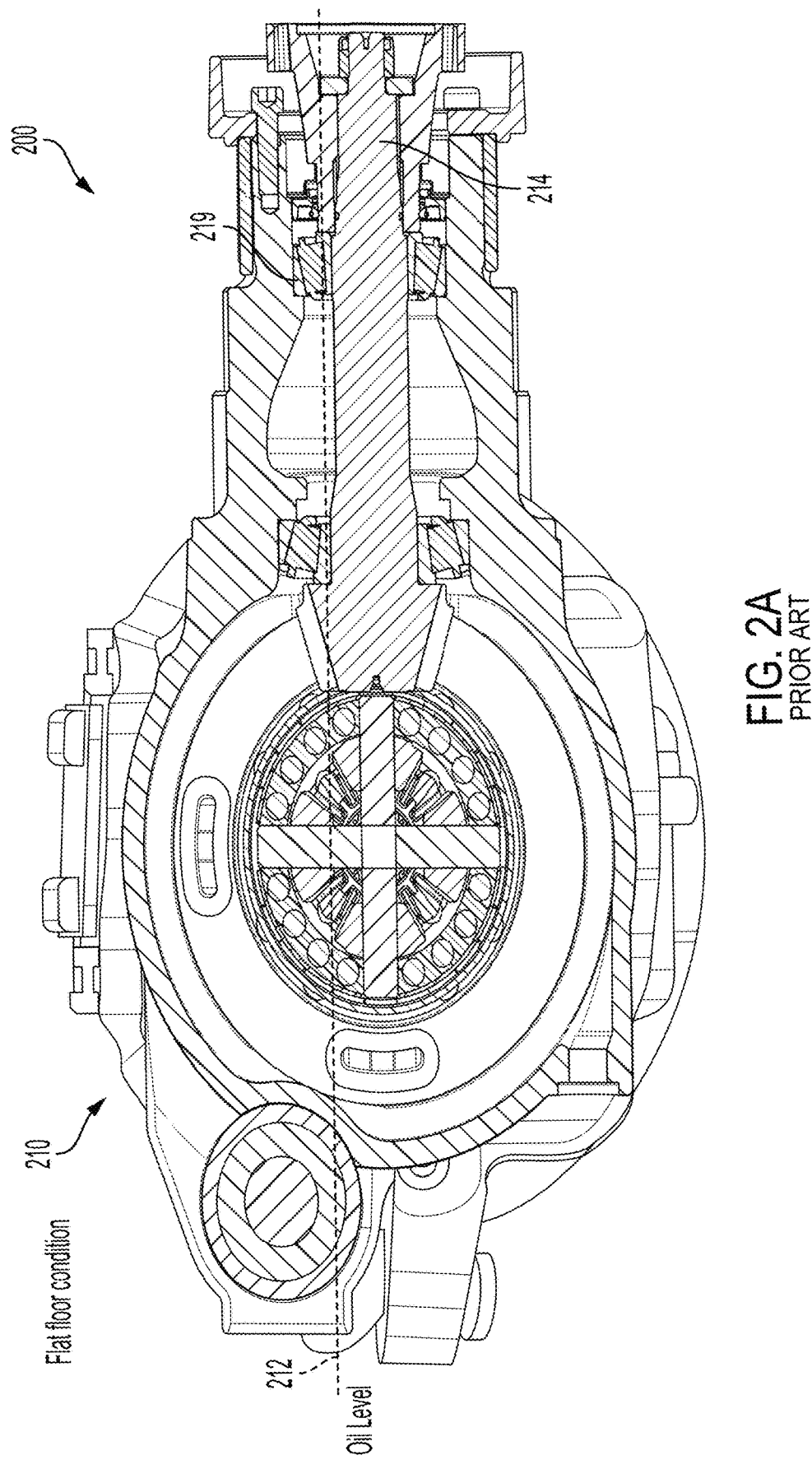
FIGS. 2A and 2C show a cross-section of a lubrication system of an axle assembly according to the prior art.
Figure 2B:
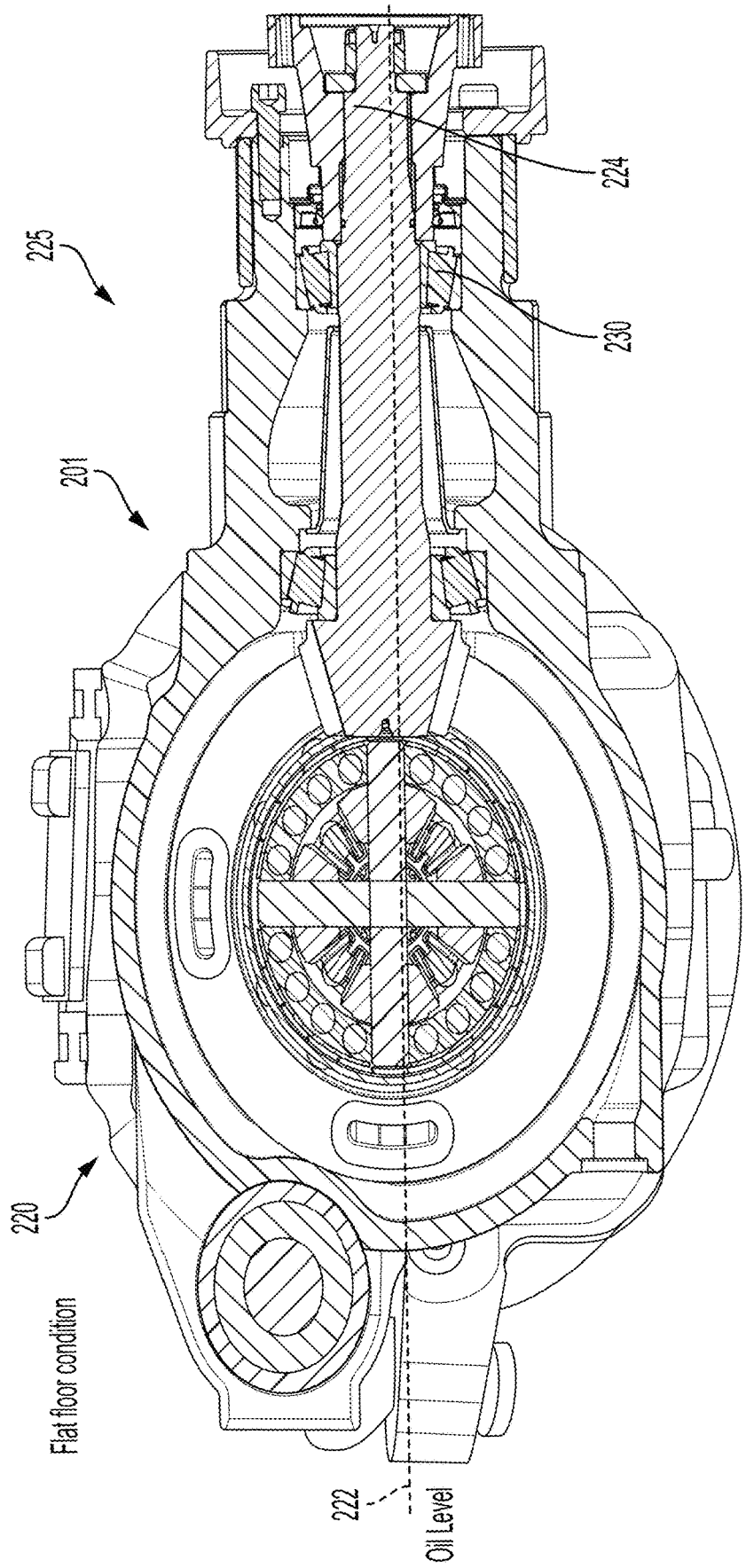
FIGS. 2B and 2D show a cross-section of a lubrication system of an axle assembly according to an embodiment of the present disclosure.
Figure 2C:
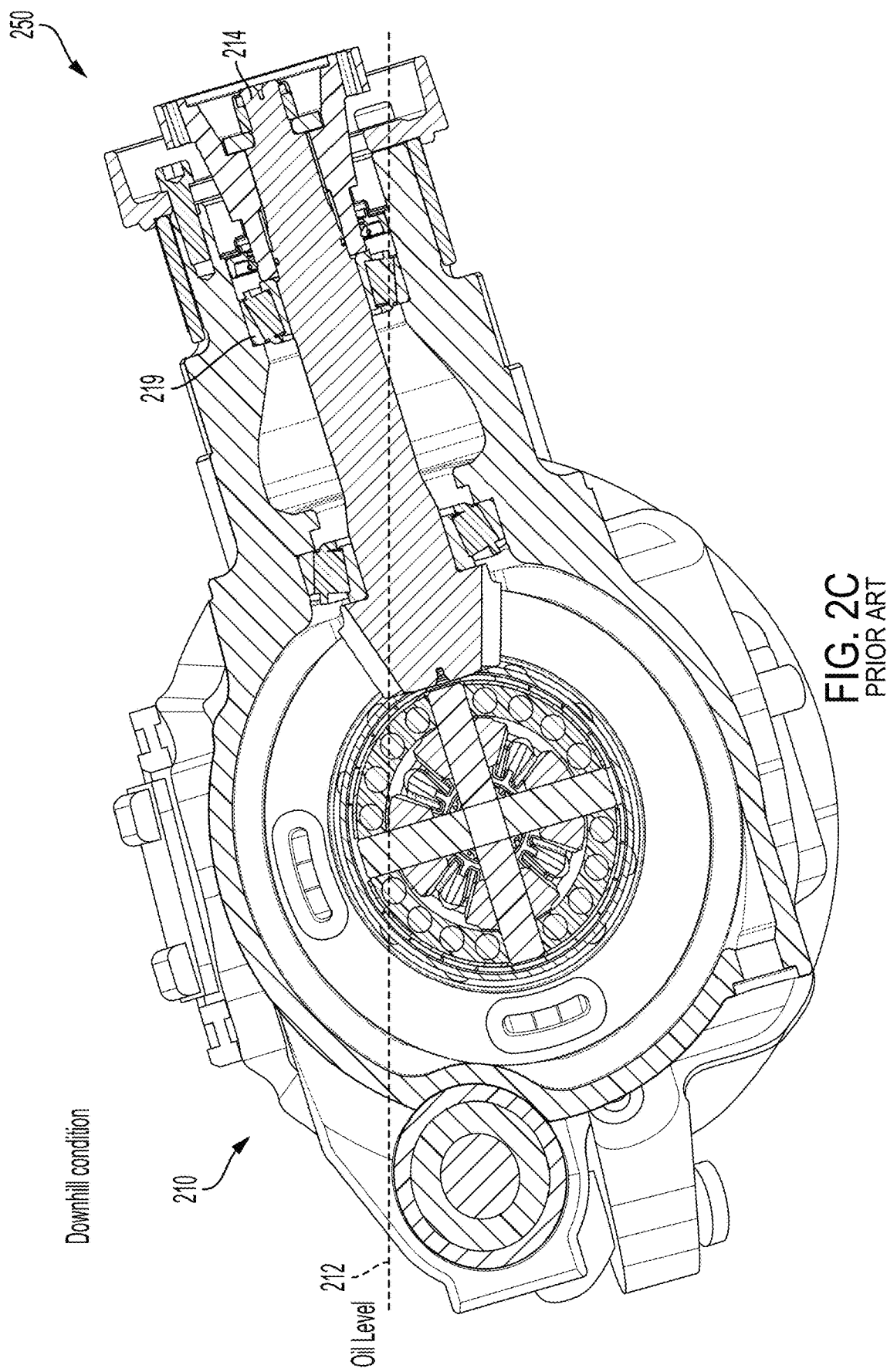
Figure 2D:
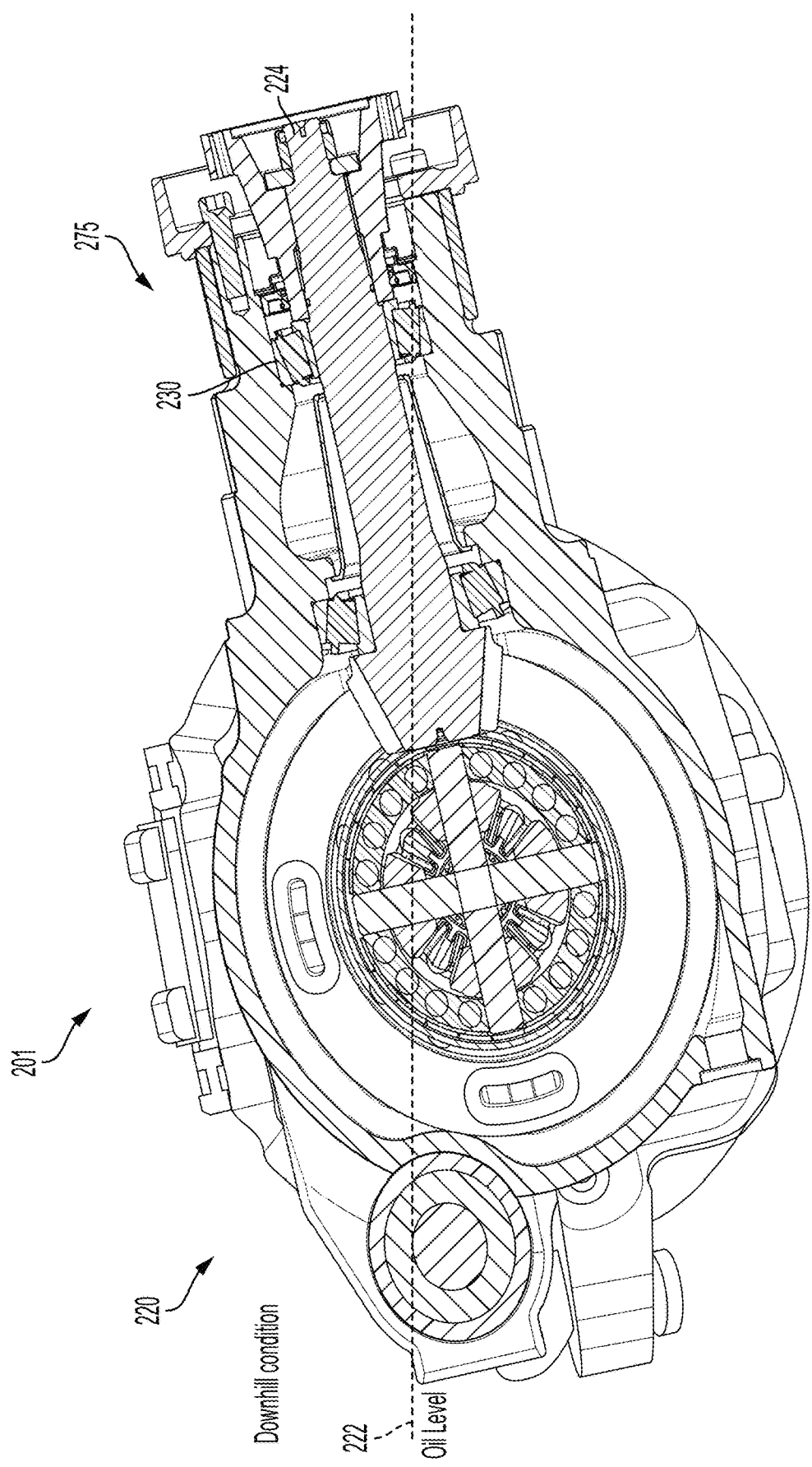
Figure 3:
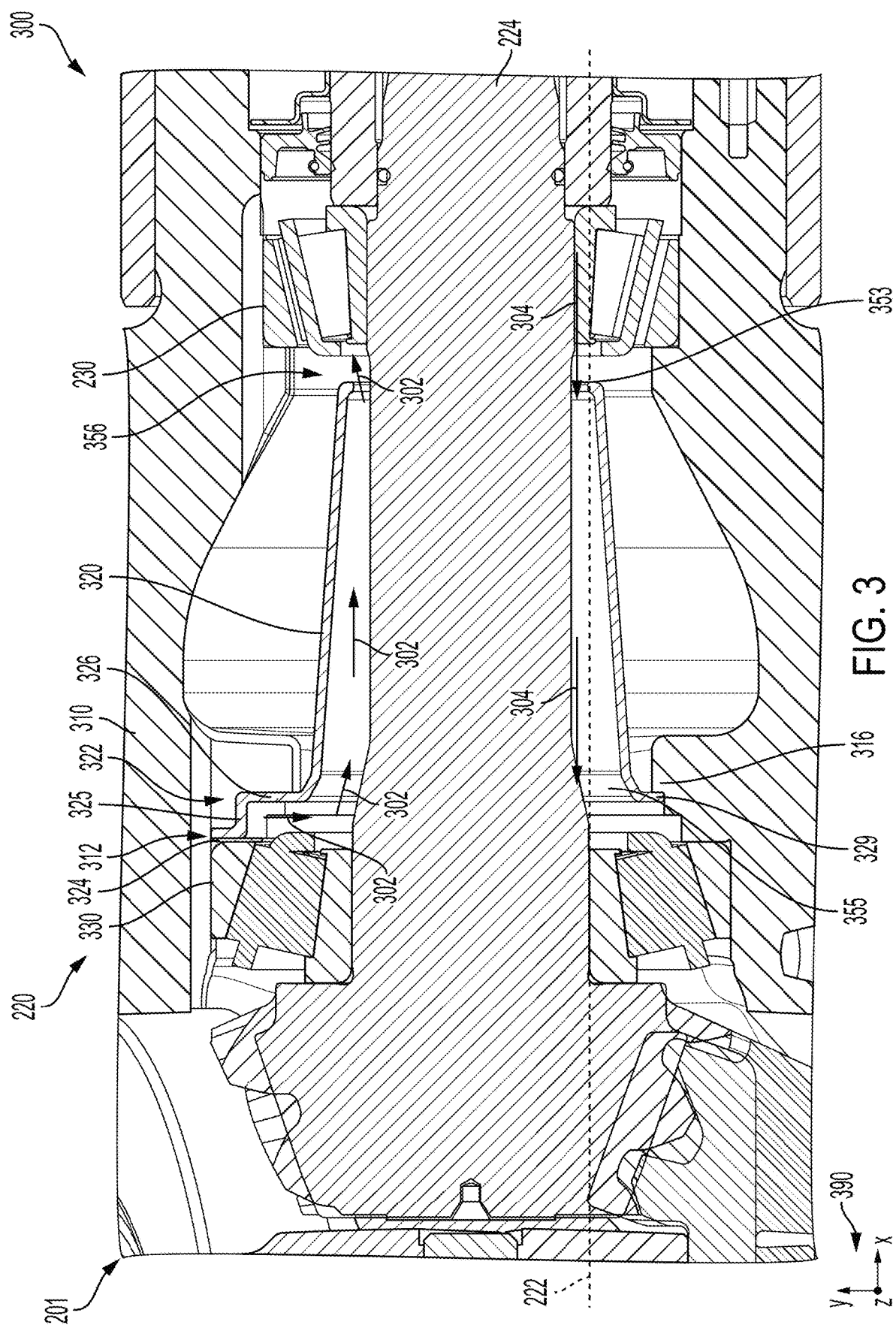
FIG. 3 shows an example lubricant flow through the lubrication system according to an embodiment of the present disclosure.
Figure 4:
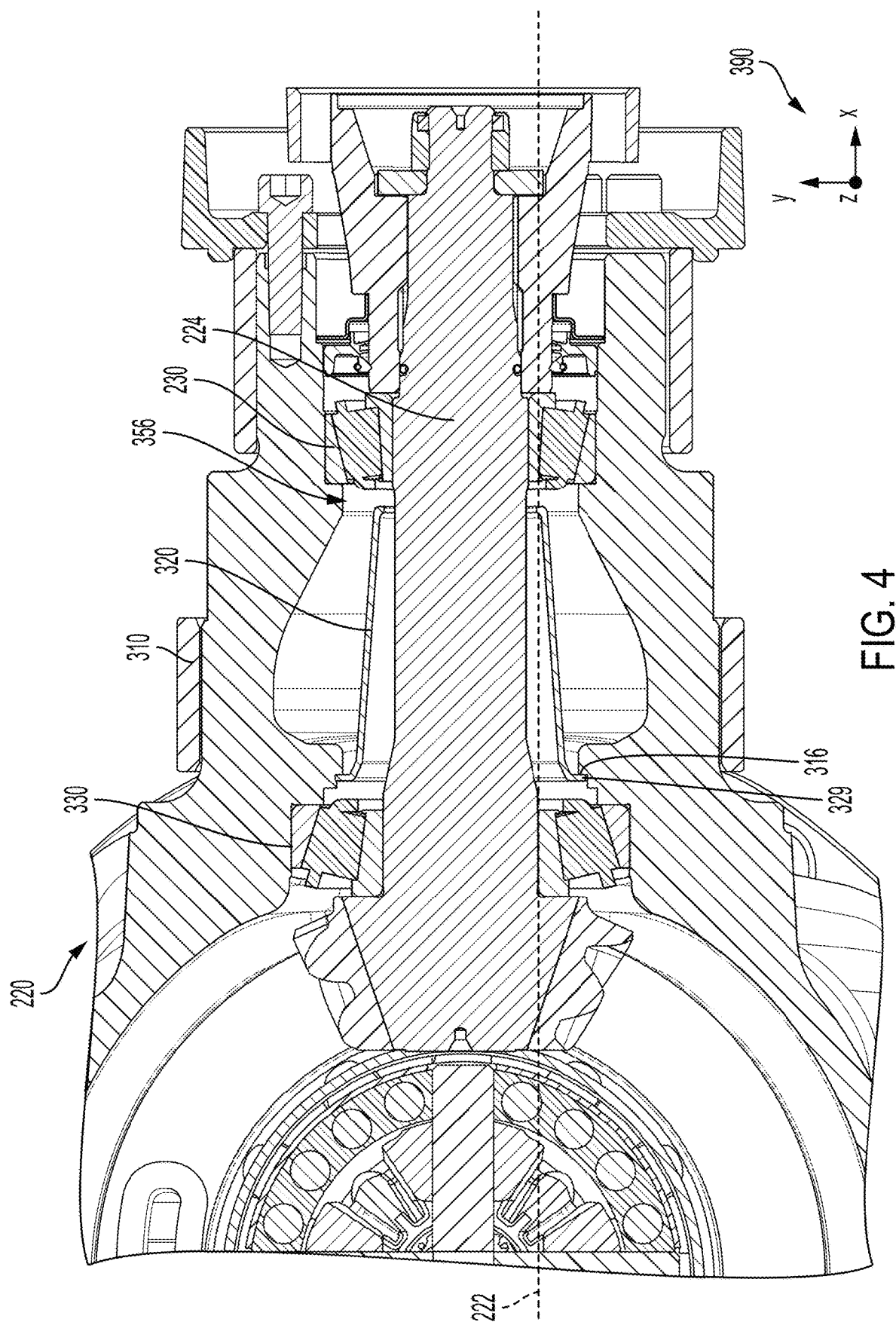
FIG. 4 shows a second cross-sectional view of the lubrication system according to an embodiment of the present disclosure.
Figure 5A:
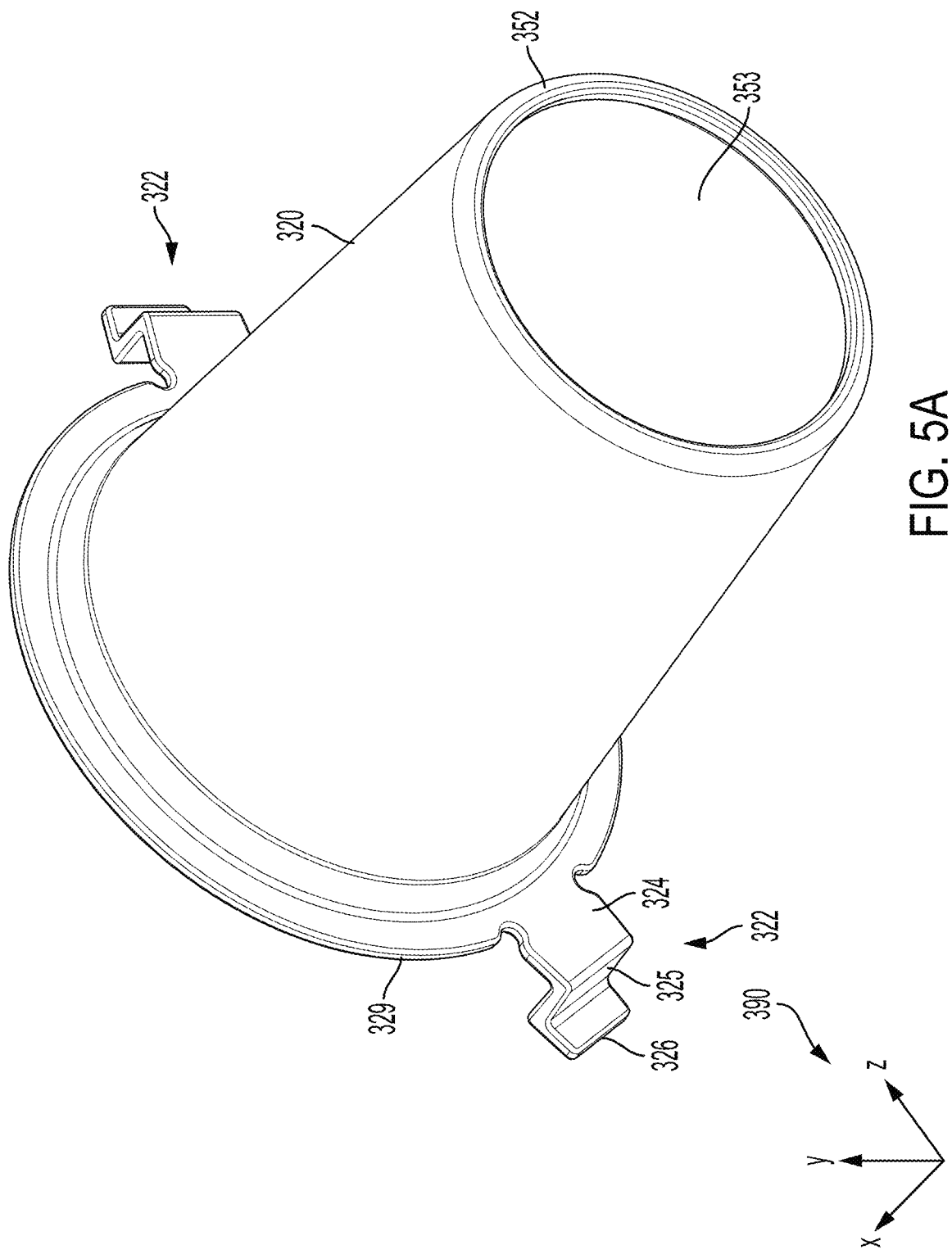
FIG. 5A shows a first view of a bulkhead of the lubrication system according to an embodiment of the present disclosure.
Figure 5B:
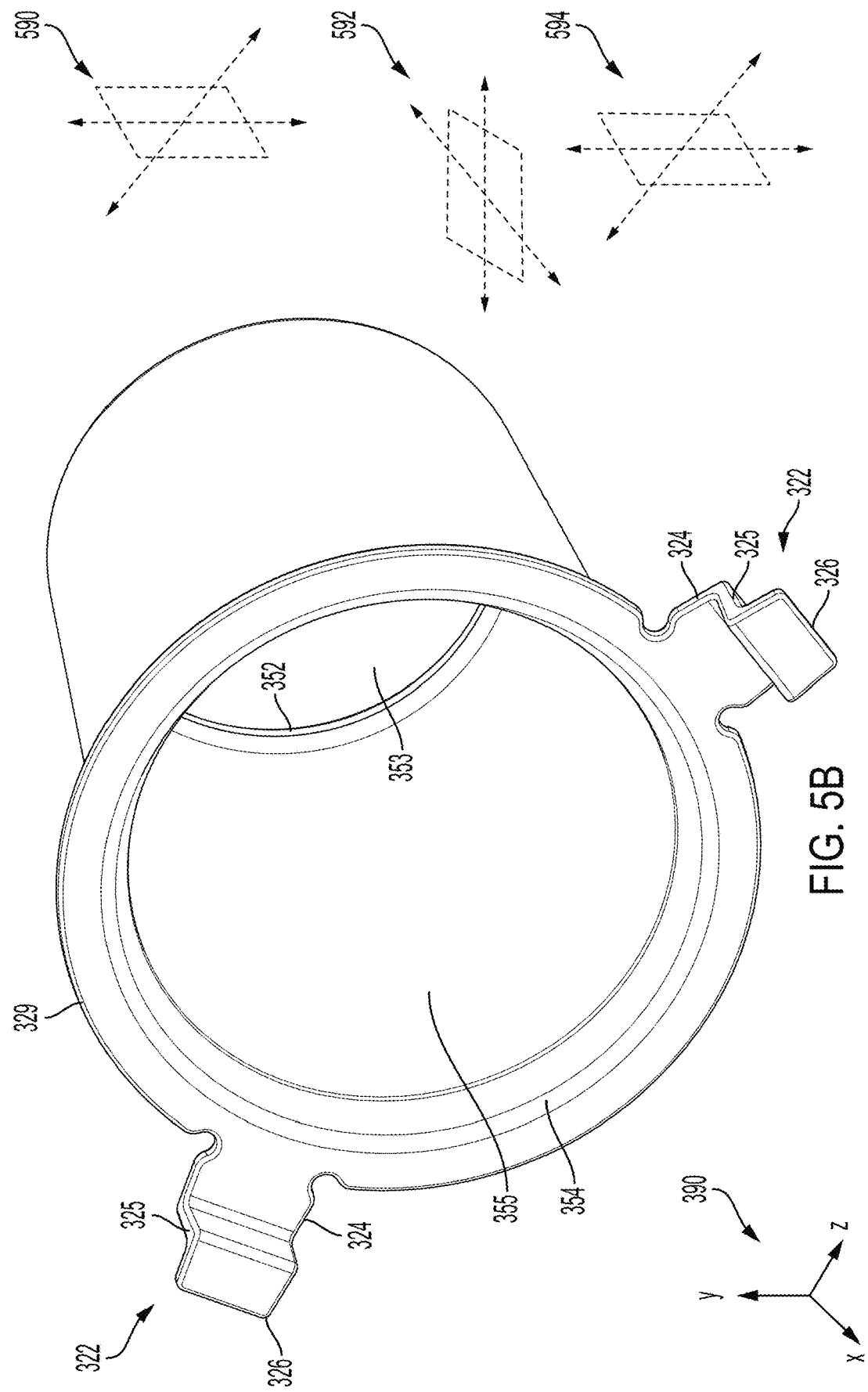
FIG. 5B shows a second view of the bulkhead of the lubrication system according to an embodiment of the present disclosure.
Figure 6B:
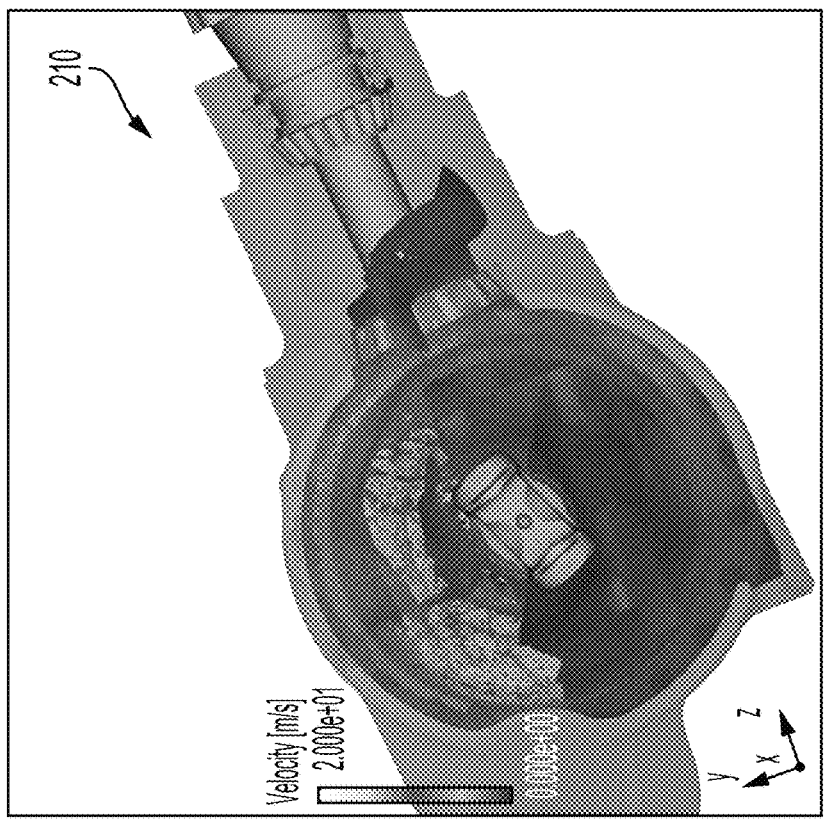
FIGS. 6A and 6B show a coolant flow comparison between the present disclosure and the prior art, respectively.
Figure 6A:
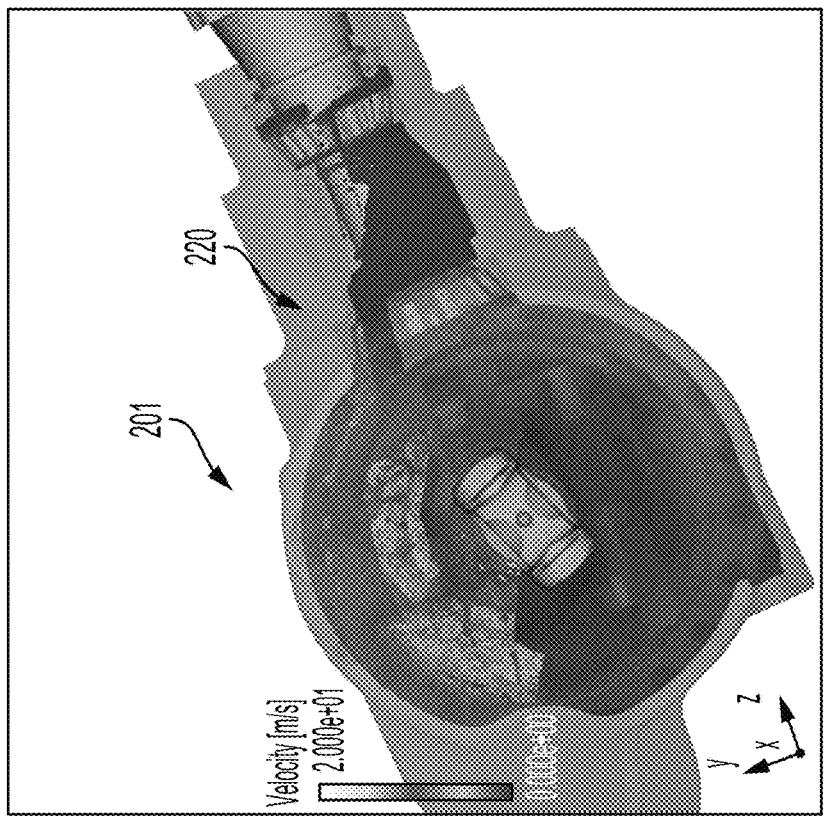

The following description relates to systems for a lubrication system. The lubrication system may be included in an axle of a vehicle. FIG. 1 shows an example of a vehicle comprising the lubrication system. FIGS. 2A and 2C show a cross-section of a lubrication system of an axle assembly according to the prior art. FIGS. 2B and 2D show a cross-section of a lubrication system of an axle assembly according to an embodiment of the present disclosure. FIG. 3 shows an example lubricant flow through the lubrication system according to an embodiment of the present disclosure. FIG. 4 shows a second cross-sectional view of the lubrication system according to an embodiment of the present disclosure. FIG. 5A shows a first view of a bulkhead of the lubrication system according to an embodiment of the present disclosure. FIG. 5B shows a second view of the bulkhead of the lubrication system according to an embodiment of the present disclosure. FIGS. 6A and 6B show a coolant flow comparison between the present disclosure and the prior art, respectively.

FIG. 1 shows a schematic depiction of a vehicle 6 with a powertrain 8 that may include a prime mover 54 and a transmission 60. The vehicle 6 may be a passenger vehicle, a commercial vehicle, a heavy-duty vehicle, an off-highway vehicle, an agricultural vehicle, a plane, a boat, or other vehicle system that utilizes lubricant.

The prime mover 54 may be electrically connected to an energy storage device 58 (e.g., one or more traction batteries, capacitors, fuel cells, combinations thereof, and the like). Further, the prime mover 54 may be configured to operate as a generator, during selected conditions, to provide electrical power to charge the energy storage device 58, for example.

In some examples, the vehicle 6 may include an internal combustion engine (ICE) configured to operate in combination with or independently of the prime mover 54. In this way, the vehicle 6 may be configured as a hybrid vehicle in some examples.

In the illustrated example, the transmission 60 delivers mechanical power to a differential 62 of an axle assembly 53. However, it will be appreciated that the transmission 60 may additionally or alternatively deliver mechanical power to the other axle 64 in the vehicle 6. Still further, in other examples, the transmission may be incorporated into one of the axles to form an electric axle assembly. In the electric axle example, an internal combustion engine may provide mechanical power to the other axle, in some cases. The axle assembly 53 may include a lubrication system, as will be described in greater detail below.

The transmission 60 (e.g., a gearbox) may be configured to receive torque from the prime mover 54 via a shaft (e.g., a drive shaft) and/or other suitable mechanical components. The transmission 60 may output torque to the differential 62. The output torque may be moderated based on selective adjustments to gear engagement at the transmission 60 to accommodate desired vehicle operation. Torque from the transmission 60 may drive rotation of the differential 62, which may in turn drive rotation of axle shafts 66, which are rotationally coupled to vehicle wheels 55. Vehicle wheels 56 may rotate when vehicle wheels 55 are rotating against a surface.

A controller 112 may form a portion of a control system 114. The control system 114 is shown receiving information from sensors 116 and sending control signals to actuators 181. As one example, the sensors 116 may include sensors such as a battery level sensor, a clutch activation sensor, one or more position sensors of the electric motor, etc. The controller 112 may receive input data from the sensors, process the input data via a processor, and trigger the actuators in response to the processed input data based on instruction or code programmed therein corresponding to one or more routines.

FIGS. 2A and 2C show prior art examples of a lubrication system 210 of an axle assembly. The prior art example 200 of FIG. 2A shows the lubrication system on a level surface and the prior art example 250 of FIG. 2C shows the lubrication system 210 on a downhill sloped surface. When oriented on the downhill sloped surface, the lubrication system 210 does not provide lubricant to a pinion tail bearing 219. Coolant flow dynamics of the lubrication system 210 positioned on the downhill sloped surface are shown in FIG. 6B.

FIGS. 2B and 2D show examples of a lubrication system 220 of an axle assembly 201. The axle assembly 201 may be identical to the axle assembly 53 of FIG. 1. FIG. 2B shows an example 225 of the lubrication system 220 positioned on a level surface. FIG. 2D shows an example 275 of the lubrication system 220 positioned on a downhill sloped surface. When oriented on both the level surface and the downhill surface, the lubrication system 220 provides a determined amount of lubrication to a pinion tail bearing 230. Coolant flow dynamics of the lubrication system 220 positioned on the downhill sloped surface are shown in FIG. 6A.

As illustrated in FIGS. 6A and 6B, the lubrication system 220 provides a greater amount of lubrication to the pinion tail bearing when on the downhill surface compared to the prior art lubrication system 210. Additionally, the lubricant levels of the lubrication system 210 and the lubrication system 220 are compared in the examples of FIGS. 2A and 2B. As illustrated, the lubricant level 212 of the lubrication system 210 is in-line with an upper surface of an axle 214. The lubricant level 222 of the lubrication system 220 is in-line with a lower surface of an axle 224 of the present disclosure. The axle 224 may turn one of the vehicle wheels 55 or vehicle wheels 56 of FIG. 1.

Turning now to FIG. 3, it shows an embodiment 300 of the lubrication system 220 of the axle assembly 201. As such, components previously introduced may be similarly numbered in this and subsequent figures. A lubricant flow path is shown via arrows 302 and 304. Arrows 302 illustrate a lubricant flow path from a pinion head bearing 330 to the pinion tail bearing 230. The pinion head bearing 330 may be arranged closer to a center of the axle 224 than the pinion tail bearing 230.

An axis system 390 is shown comprising an x-axis parallel to an axial direction, a y-axis parallel to a vertical direction, and a z-axis parallel to a transverse direction. The y-axis is normal to the x-axis and the z-axis is normal to each of the x- and y-axes.

Lubricant may flow from the pinion head bearing 330 to the pinion tail bearing 230 via an interaction between a bulkhead 320 and lubricant ducts shaped into a central housing 310 of the axle assembly 201, such as lubricant duct 312. The lubricant may return from the pinion tail bearing 230 to a center of the axle system, as illustrated via arrows 304.

FIGS. 5A and 5B show detailed views of the bulkhead 320. FIG. 4 shows a different cross-sectional view of the axle assembly 201, relative to the cross-sectional view of FIG. 3, comprising the bulkhead 320. FIGS. 3, 4, 5A, and 5B are described in tandem herein. The bulkhead 320 may include at least one tab 322. The at least one tab 322 may include a Z-shape. The at least one tab 322 may include a first surface 324 parallel to a first plane 590, a second surface 325 parallel to a second plane 592, and a third surface 326 parallel to a third plane 594. In one example, the second plane 592 is normal to the first plane 590 and the third plane 594. The first plane 590 is parallel to the third plane 594 in one example. The first plane 590 and the third plane 594 may be parallel to a radial plane of the bulkhead 320.

The at least one tab 322 may herein be a first tab 322 of a plurality of tabs, wherein the bulkhead 320 further comprises a second tab 328 shown in FIGS. 5A and 5B. The second tab 328 may be identical to the first tab 322. An angle between the first tab 322 and the second tab 328 may be less than 180°. For example, of the angle may be equal to 165°, 150°, 135°, or less.

The first tab 322 and the second tab 328 may extend from a rim 329. The first tab and the second tab 328 may extend into the lubricant duct 312. The first tab 322 and the second tab 328 may press against surfaces of the lubricant duct 312 and against the pinion head bearing 330. The first tab 322 and the second tab 328 may be deformable (e.g., flexible) and function as springs. As such, the bulkhead 320 may be installed within the central housing 310 without an additional component such as a snap ring, screw(s), or other fastening device. In one example, the rim 329 may be continuous with the third surface 326 at locations where the first tab 322 or the second tab 328 extend from the rim 329. The first tab 322 and the second tab 328 may be configured to press the rim 329 into a seat 316 of the central housing 310.

The seat 316 interfacing with the rim 329 is shown in greater detail with respect to FIG. 4. The rim 329 may extend radially outward from the bulkhead 320. The rim 329 may extend around an entire circumference of an entrance of the bulkhead 320.

The bulkhead 320 may include a conical shape. Additionally or alternatively, the bulkhead 320 may include a cylindrical shape. In one example, the bulkhead 320 comprises a frustoconical shape. In one example, a diameter of the bulkhead 320 decrease in a direction from the pinion head bearing 330 to the pinion tail bearing 230. In this way, a flow-through area, between the bulkhead 320 and the axle 224, through which lubricant flows may decrease as the lubricant approaches the pinion tail bearing 230. As such, an exit diameter 352, corresponding to an exit opening 353 of the bulkhead 320, is smaller than an entrance diameter 354 of the bulkhead 320. The entrance diameter 354 may correspond to an entrance opening 355 of the bulkhead 320. The rim 329 may extend radially outward from the entrance opening 355.

In some examples, additionally or alternatively, the lubricant level and lubricant flow to the pinion tail bearing 230 may increase when the exit diameter 352 is smaller. As illustrated, the lubricant level is below the axle 224. Thus, when the exit diameter 352 is larger, the lubricant flow to the pinion head bearing 330 may increase and lubricant flow to the pinion tail bearing 230 may decrease. A gap 356 may exist between the exit diameter 352 and the pinion tail bearing 230. The gap 356 may be configured to provide a determined flow with a center of the axle 224. A size of the gap 356 (e.g., a distance between the bulkhead 320 and the pinion tail bearing 230) may be configured to adjust the lubricant flow to the pinion tail bearing 230. For example, if the size of the gap 356 is smaller, then the lubricant flow to the tail pinion bearing may be higher.

FIGS. 1, 2B, 2D, and 3-6A show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). FIGS. 3-5B are shown approximately to scale.

The disclosure provides support for a lubrication system including a bulkhead arranged around an axle and in contact with a seat of a central housing, the bulkhead comprising an entrance diameter larger than an exit diameter, wherein the entrance diameter is positioned near a pinion head bearing and the exit diameter is positioned near a pinion tail bearing. A first example of the lubrication system further includes where a rim extends radially outward from the entrance diameter and is in contact with the seat of the central housing. A second example of the lubrication system, optionally including the first example, further includes where the bulkhead comprises at least one tab in contact with surfaces of a lubricant duct of the central housing. A third example of the lubrication system, optionally including one or more of the previous examples, further includes where the at least one tab presses against the pinion head bearing. A fourth example of the lubrication system, optionally including one or more of the previous examples, further includes where the at least one tab comprises a first surface parallel to a first plane, a second surface parallel to a second plane normal to the first plane, and a third surface parallel to a third plane and the first plane. A fifth example of the lubrication system, optionally including one or more of the previous examples, further includes where a gap is positioned between the exit diameter and the pinion tail bearing. A sixth example of the lubrication system, optionally including one or more of the previous examples, further includes where a lubrication fill line is positioned below the axle.

The disclosure provides additionally support for an axle system including a lubrication system comprising one or more lubricant ducts arranged in a central housing, a bulkhead positioned around an axle and comprising a plurality of tabs pressed into portions of the one or more lubricant ducts, and wherein an entrance of the bulkhead positioned near a pinion head bearing is larger than an exit positioned near a pinion tail bearing. A first example of the axle system further includes where tabs of the plurality of tabs are positioned less than 180° apart. A second example of the axle system, optionally including the first example, further includes where the plurality of tabs is flexible. A third example of the axle system, optionally including one or more of the previous examples, further includes where the plurality of tabs extends from a rim of the bulkhead, wherein the rim is pressed against a seat of the central housing. A fourth example of the axle system, optionally including one or more of the previous examples, further includes where the plurality of tabs presses against the pinion head bearing. A fifth example of the axle system, optionally including one or more of the previous examples, further includes where the bulkhead comprises a frustoconical shape. A sixth example of the axle system, optionally including one or more of the previous examples, further includes where the bulkhead is spaced away from the pinion tail bearing. A seventh example of the axle system, optionally including one or more of the previous examples, further includes where the pinion head bearing is positioned closer to a center of the axle system relative to the pinion tail bearing.

The disclosure provides further support for a lubrication system for an axle assembly, the lubrication system including a bulkhead surrounding a portion of an axle, the bulkhead comprising an entrance opening and an exit opening, the exit opening is smaller than the entrance opening and arranged on an opposite side of the bulkhead relative to the entrance opening, wherein the bulkhead further comprises a first tab and a second tab extending from a rim of the entrance opening and pressing against a pinion head bearing. A first example of the lubrication system further includes where the exit opening is spaced away from a pinion tail bearing. A second example of the lubrication system, optionally including the first example, further includes where the rim is pressed against a seat of a central housing of the axle assembly. A third example of the lubrication system, optionally including one or more of the previous examples, further includes where the bulkhead is configured to direct lubricant from the pinion head bearing, through a space between the bulkhead and the axle, to a pinion tail bearing. A fourth example of the lubrication system, optionally including one or more of the previous examples, further includes where the exit opening is spaced away from the axle and a pinion tail bearing.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A lubrication system, comprising:
   a bulkhead arranged around an axle and in contact with a seat of a central housing, the bulkhead comprising an entrance diameter larger than an exit diameter, wherein the entrance diameter is positioned near a pinion head bearing and the exit diameter is positioned near a pinion tail bearing.

2. The lubrication system of claim 1, wherein a rim extends radially outward from the entrance diameter and is in contact with the seat of the central housing.

3. The lubrication system of claim 1, wherein the bulkhead comprises at least one tab in contact with surfaces of a lubricant duct of the central housing.

4. The lubrication system of claim 3, wherein the at least one tab presses against the pinion head bearing.

5. The lubrication system of claim 3, wherein the at least one tab comprises a first surface parallel to a first plane, a second surface parallel to a second plane normal to the first plane, and a third surface parallel to a third plane and the first plane.

6. The lubrication system of claim 1, wherein a gap is positioned between the exit diameter and the pinion tail bearing.

7. The lubrication system of claim 1, wherein a lubrication fill line is positioned below the axle.

8. An axle system, comprising:
 a lubrication system comprising one or more lubricant ducts arranged in a central housing, a bulkhead positioned around an axle and comprising a plurality of tabs pressed into portions of the one or more lubricant ducts, and wherein an entrance of the bulkhead positioned near a pinion head bearing is larger than an exit positioned near a pinion tail bearing.

9. The axle system of claim 8, wherein tabs of the plurality of tabs are positioned less than 180° apart.

10. The axle system of claim 8, wherein the plurality of tabs is flexible.

11. The axle system of claim 8, wherein the plurality of tabs extends from a rim of the bulkhead, wherein the rim is pressed against a seat of the central housing.

12. The axle system of claim 8, wherein the plurality of tabs presses against the pinion head bearing.

13. The axle system of claim 8, wherein the bulkhead comprises a frustoconical shape.

14. The axle system of claim 8, wherein the bulkhead is spaced away from the pinion tail bearing.

15. The axle system of claim 8, wherein the pinion head bearing is positioned closer to a center of the axle system relative to the pinion tail bearing.

16. A lubrication system for an axle assembly, the lubrication system, comprising:
 a bulkhead surrounding a portion of an axle, the bulkhead comprising an entrance opening and an exit opening, the exit opening is smaller than the entrance opening and arranged on an opposite side of the bulkhead relative to the entrance opening, wherein the bulkhead further comprises a first tab and a second tab extending from a rim of the entrance opening and pressing against a pinion head bearing.

17. The lubrication system of claim 16, wherein the exit opening is spaced away from a pinion tail bearing.

18. The lubrication system of claim 16, wherein the rim is pressed against a seat of a central housing of the axle assembly.

19. The lubrication system of claim 16, wherein the bulkhead is configured to direct lubricant from the pinion head bearing, through a space between the bulkhead and the axle, to a pinion tail bearing.

20. The lubrication system of claim 16, wherein the exit opening is spaced away from the axle and a pinion tail bearing.

\* \* \* \* \*